US006480169B2

(12) United States Patent
Fowler

(10) Patent No.: US 6,480,169 B2
(45) Date of Patent: Nov. 12, 2002

(54) METHOD AND APPARATUS FOR RECEIVING SIGNALS IN TWO DIFFERENT FREQUENCY BANDS USING A SINGLE ANTENNA

(75) Inventor: Clarence W. Fowler, Elgin, TX (US)

(73) Assignee: Raven Industries Inc., Sioux Falls, SD (US)

( * ) Notice: Subject to any disclaimer, the term of this patent is extended or adjusted under 35 U.S.C. 154(b) by 0 days.

(21) Appl. No.: 09/766,086

(22) Filed: Jan. 19, 2001

(65) Prior Publication Data

US 2002/0097186 A1 Jul. 25, 2002

(51) Int. Cl.[7] .................................................. H04B 1/06
(52) U.S. Cl. ........................ 343/806; 343/702; 455/344
(58) Field of Search .......................... 343/806, 700 MS, 343/893, 904, 905, 715; 455/344, 66, 90, 289

(56) References Cited

U.S. PATENT DOCUMENTS 6,195,540 B1 * 2/2001 Ogino et al. ................ 455/344

* cited by examiner

*Primary Examiner*—Don Wong
*Assistant Examiner*—James Clinger
(74) *Attorney, Agent, or Firm*—Altera Law Group, LLC

(57) ABSTRACT

The invention provides for the reception of a L-band signals and MF-band signals using a single antenna element by employing an L-band antenna in conjunction with a connection cable that acts to receive MF-band signals, the invention further providing for the isolation of the L-band signals from an MF-band processing path and isolating the MF-band signals from an L-band processing path.

20 Claims, 4 Drawing Sheets

METHOD AND APPARATUS FOR RECEIVING SIGNALS IN TWO DIFFERENT FREQUENCY BANDS USING A SINGLE ANTENNA

TECHNICAL FIELD OF THE INVENTION

The present invention relates to antenna receiving structures for reception of GPS and Differential GPS signals.

BACKGROUND OF THE INVENTION

In present Differential Global Positioning System (DGPS) receivers, separate antenna receiving structures are used for receiving the L-band GPS signals from GPS satellites and for receiving the MF-band differential correction signals from a local beacon. An L-band signal transmitted from a GPS satellite is around 1.575 Giga-Hertz (GHz) and an MF-band signal transmitted from a local beacon is in the 283–325 Kilo-Hertz (KHz) range. The MF-band signal from the local beacon contains differential correction information to supplement the position information provided by the L-band satellite signals to provide enhanced accuracy in position determinations made by a processor in the DGPS receiver.

An L-band antenna receiving structure for receiving and initially processing an L-band GPS signal is shown in FIG. 1. FIG. 1 illustrates a patch antenna 100 typically used for reception of L-band signals from GPS satellites. Other antenna structures for receiving L-band signals are known in the art. The patch antenna 100 comprises a receiving element 101 mounted on a low-loss dielectric slab 102. Receiving element 101 is simply a thin flat patch of conductor. On the underside of the dielectric is a conductive surface that acts as an antenna ground plane 104.

The L-band signal energy received by the patch antenna 100 is coupled to electronic front-end receiver circuitry of a GPS receiver. In particular, coupling is provided comprising a first conductor 107 and a second conductor 109, as shown. First conductor 107 connects receiving patch element 101 to circuitry of a front end receiving subsystem 121. Front end receiving subsystem 121 typically comprises a band pass filter centered at or near the L-band GPS carrier frequency and a pre-amplifier suitable for amplification of the filtered L-band signal. Second conductor 109 connects antenna ground plane 104 to a ground of front end receiving subsystem 121. Front-end receiving subsystem 121 couples the GPS signal to the remainder of a GPS receiver system (not shown) for further processing of the satellite information signal.

In a Differential GPS (DGPS) receiving system, a second antenna receiving structure suitable for receiving differential corrections from a local beacon at MF-band frequencies is provided. An MF-band antenna is connected to a front end receiving subsystem that typically provides a band pass filter centered in the MF band and a low noise amplifier. The differential correction signal from the MF-band receiving structure is directed to the remainder of the DGPS receiving system for further processing of the differential correction signal.

Suitable antenna elements for receiving MF-band signals are known in the art, including voltage probe (E-field) and loop (H-field) antennas. For reasons of size and efficiency, patch antennas are generally unsuitable for reception of the MF-band signals. More particularly, a patch antenna suitable for L-band reception is generally unsuitable for reception of an MF-band signal. Similarly, a probe antenna suitable for reception of an MF-band signal is generally unsuitable for reception of an L-band signal. Thus, separate MF-band and L-band receiving structures are provided in a DGPS receiving system.

The MF-band antenna receiving structure may be housed within a different housing structure as the L-band antenna receiving structure. In some cases they are housed together within the same structure. This is advantageous when, for example, it is desirable to have both the L-band and MF-band antenna receiving structures located in approximately the same position or in the same package. In applications where it is desirable to house the antenna receiving structures together in a relatively small package it becomes problematic to efficiently incorporate two different antenna elements into the package and to avoid unwanted RF-coupling and radiation effects.

For at least these reasons, there is a need for a method and apparatus for receiving both the L-band GPS satellite signals and the MF-band differential correction signals using a single antenna structure.

SUMMARY OF THE INVENTION

The present invention provides a method and apparatus for receiving both L-band GPS satellite signals and MF-band differential correction signals using a single antenna structure.

According to the present invention an L-band antenna provides for the reception of L-band satellite signals. The L-band signal is electrically coupled to a front end receiving subsystem by way of an electrical connection that also functions to receive ME-band signals. The receiving subsystem provides an electronic processing path for the L-band signal received by the L-band antenna. The receiving subsystem also provides an electronic processing path for the MF-band signal received by way of the electrical connection. The receiving subsystem isolates the L-band signal from the MF-band processing path and isolates the MF-band signal from the L-band processing path. In this way, the L-band antenna, in conjunction with the electrical connection that receives the MF-band signal, functions as a single dual-band antenna.

These and other aspects, features and advantages of the invention will be more readily understood with reference to the following description of embodiments of the invention and attached drawings. Persons of ordinary skill in the art will appreciate that various embodiments of the invention not specifically described herein fall within the scope of the invention as defined by the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
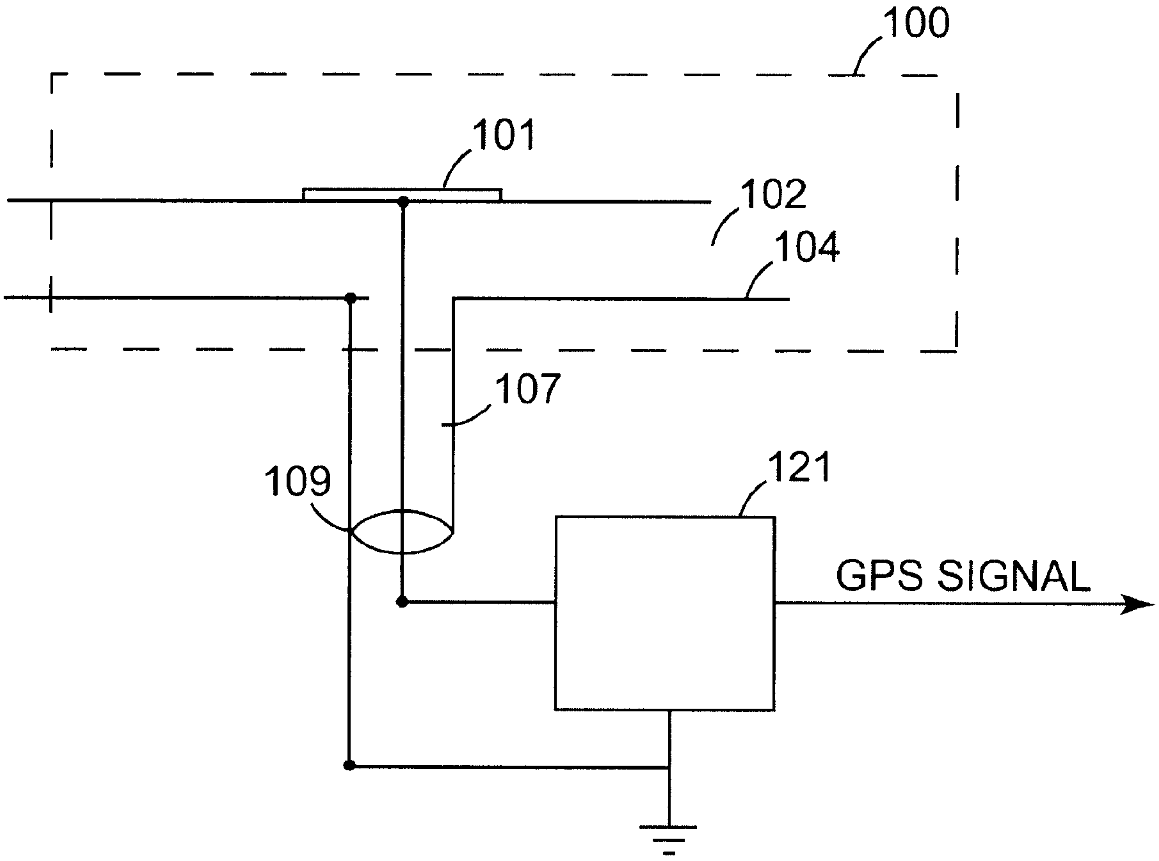
Fig. 1 (PRIOR ART)
FIG. 1 shows a prior art L-band receiving structure employing a patch antenna.
Figure 2:
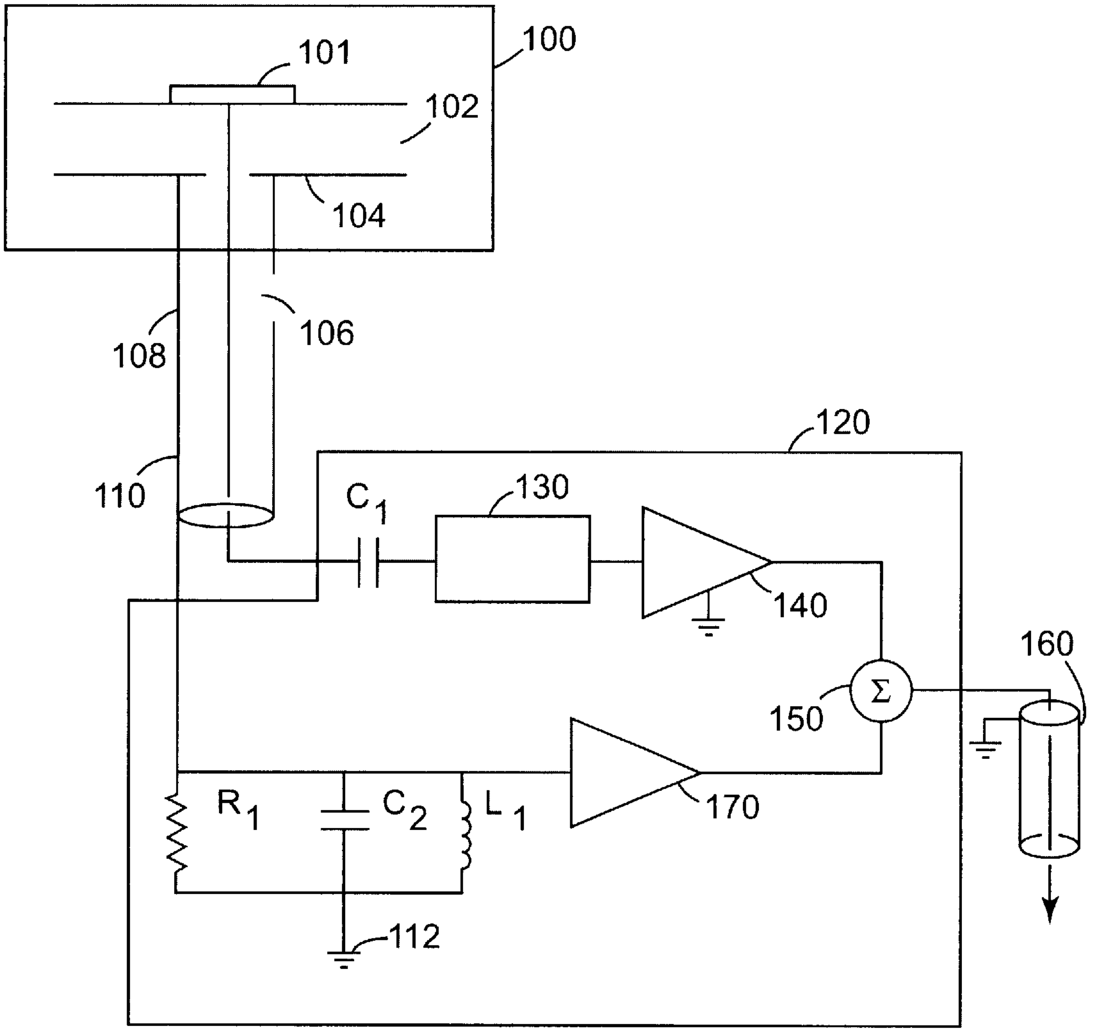
FIG. 2 shows an embodiment of the present invention.

The present invention provides a method for coupling an L-band signal and an MF-band signal to receiver circuitry using a single antenna structure. A preferred embodiment of the present invention is shown in FIG. 2. A coaxial cable 110 functions to transmit signals received by patch receiving element 101 to a dual-band receiving sub-system 120. The interior conductor 106 of coaxial cable 110 is caused to extend through dielectric slab 102 and is electrically connected to patch 101. The exterior shield 108 of coaxial cable 110 is electrically connected to antenna ground plane 104.

The present invention provides for using the exterior shield 108 of coaxial cable 110 to receive an MF-band signal while using flat patch receiving element 101 to receive the L-band antenna signals. It will be understood by persons of ordinary skill in the art that other types of L-band antenna receiving elements may be used in the present invention instead of the patch antenna used here in the description of preferred embodiments.

The L-band GPS signal is present between interior conductor 106 of coaxial cable 110 and its exterior shield 108. The MF-band Differential GPS signal is present between exterior shield 108 of coaxial cable 110 and receiver ground 112, which is preferably connected to the earth. Interior conductor 106 of coaxial cable 110 is electrically coupled to an L-band processing path. The L-band processing path comprises a GPS band pass filter 130 that receives the L-band signal through a capacitance C1. Capacitance C1 acts as a Direct Current (DC) blocking capacitor. A suitable value for C1 in this embodiment is 47 pico-Farads (pF). The signal output of band pass filter 130 is the filtered L-band GPS signal. This signal is input to a GPS pre-amplifier 140. The output of GPS pre-amplifier 140 is electrically coupled through a summing network 150 to a coaxial cable 160. The filtered and amplified L-band GPS signal is thereby coupled through coaxial cable 160 to a GPS receiver.

Exterior shield 108 of coaxial cable 110 is coupled to an MF-band processing path comprising isolation circuitry that couples exterior shield 108 to receiver ground 112 at L-band frequencies and couples exterior shield 108 to MF-band processing circuitry at MF-band frequencies, thereby isolating the L-band signal from the MF-band processing path. In FIG. 2, the isolation circuitry comprises the parallel combination of resistance R1, capacitance C2, and inductance L1 and is further connected to a low-noise high input impedance amplifier 170. In the present embodiment, amplifier 170 preferably exhibits and input impedance exceeding 10 kilo-Ohms. As will be discussed below, the output of amplifier 170 is the MF-band signal received from a local beacon after being filtered and amplified. This signal is coupled to a beacon receiver through summing network 150 and coaxial cable 160.

Capacitance C2 is chosen to present very low impedance at the L-band frequency of the GPS signal, effectively connecting the exterior shield 108 to the ground of pre-amplifier 140 at L-band frequencies. Thus, L-band signals induced in exterior shield 108 are effectively shunted to ground. In a preferred embodiment C2 has a capacitance of 270 pF to present a low impedance of less than 1 ohm at L-band. If coaxial cable 110 exhibits an impedance of about 50 ohms, C2 can present an impedance of as high as about 5 ohms without significant loss of the L-band signal power delivered to pre-amplifier 140.

Conversely, choosing capacitance C2 to be 270 pF presents an impedance of about 2 kilo-ohms at MF-band frequencies. The inductance L1 is chosen to create a reactance that substantially matches the impedance presented by C2 in the MF-band with a bandwidth of the resultant resonant circuit determinable by appropriate selection of resistance R1. Therefore, an MF-band filter comprising R1, C2, and L1 is formed to isolate L-band signals from the MF-band processing path and to band pass filter the MF-band signal. It will be understood that active circuitry may also be employed to perform the functions of these components.

By choosing L1 equal to about 1 milli-Henry (mH) and R1 equal to about 10 kilo-Ohms a Q of about 5 is achieved. This presents an impedance of about 10 kilo-Ohms between the exterior shield of coaxial cable 110 and receiver ground 112 in the MF frequency band. Experimentation demonstrates that a length of coaxial cable 110 of about 4 inches or more will yield a sufficiently sensitive receiving antenna for the MF-band when coupled to low-noise high input impedance amplifier 170. Also, a filter of higher order than the one presented here could be implemented.

Figure 3:
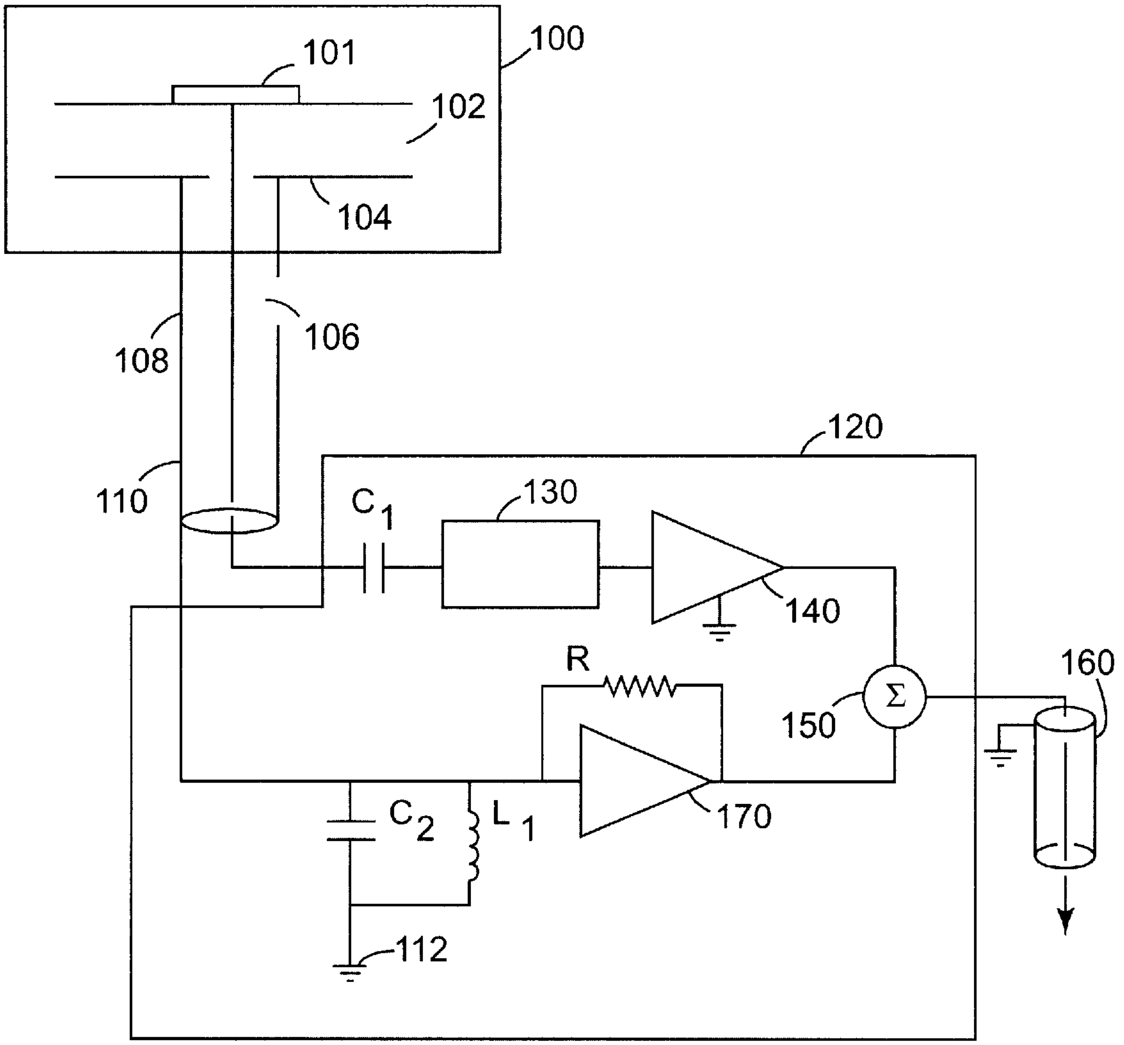
FIG. 3 shows an alternative embodiment of the present invention employing negative feedback resistance.

An alternative embodiment of the present invention is shown in FIG. 3, where the resistance R1 is implemented as a negative feedback resistance R across a low-noise amplifier 17. Low noise amplifier 17 exhibits a negative gain, G, so that the effective resistance presented in parallel with L1 and C2 is $R_{eff}=R/|G|$. Thus, if R=100 k-Ohms and G=−10, $R_{eff}$ is 10 k. This configuration provides the advantage of reducing the amplification of resistor noise in comparison to the configuration of FIG. 2.

Figure 4:
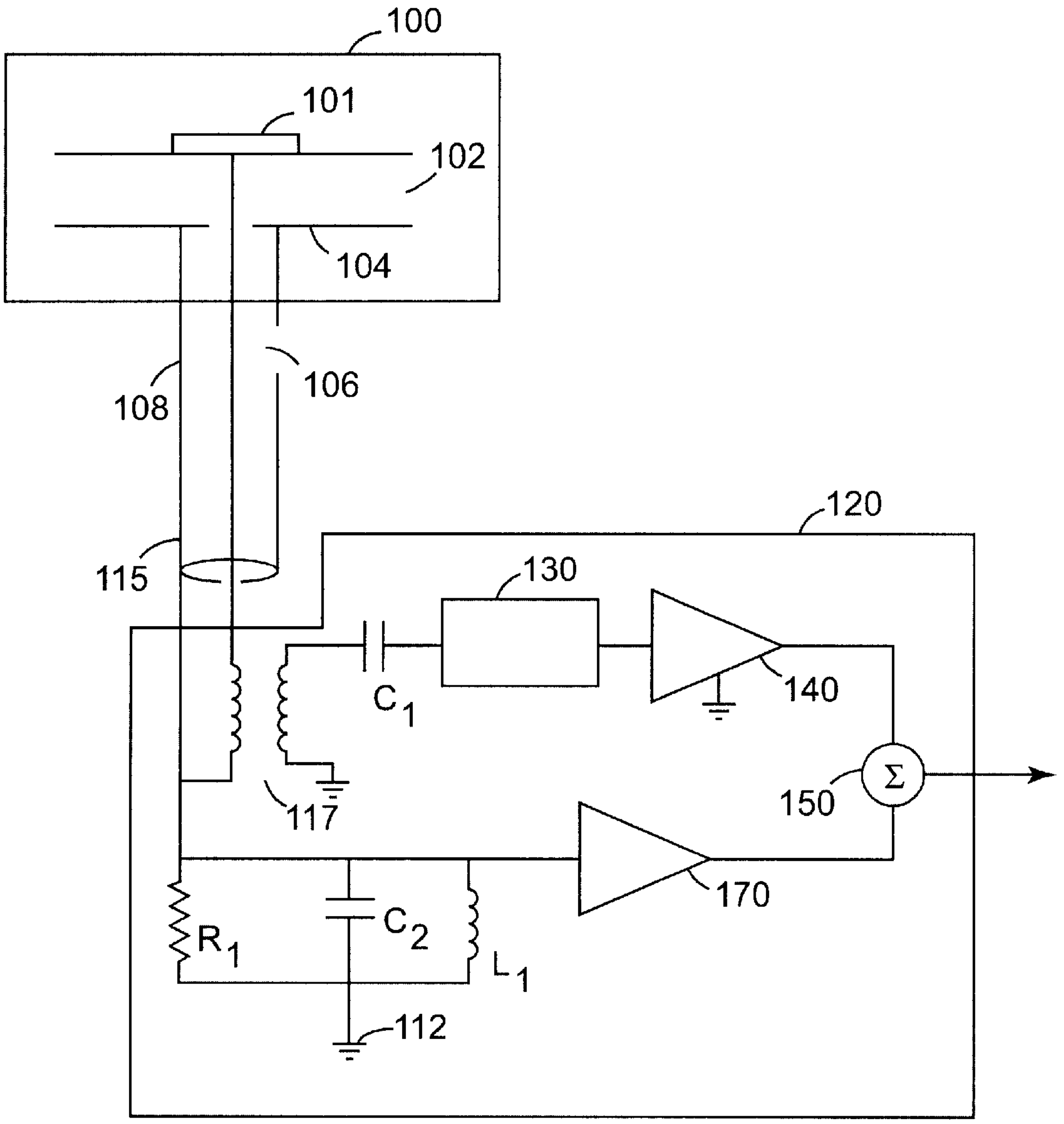
FIG. 4 shows an alternative embodiment of the invention employing transformer coupling.

Another alternative embodiment of the present invention is shown in FIG. 4. In FIG. 4, transformer cable 115 is connected across a transformer 117. A first conductor of cable 115 is connected to L-band receiving element 101 and a second conductor of cable 115 is connected to the isolation circuitry comprising R1, L1, and C2, as shown. Transformer 117 must exhibit a capacitance that is low enough to allow the parallel combination of R1, L1 and C2 to exhibit resonance in the MF-band, as explained with reference to FIG. 2.

Thus, according to the methods of the present invention an antenna structure for receiving both L-band and MF-band signals is provided. An L-band antenna provides for the reception of L-band satellite signals. The L-band signal is electrically coupled to a front end receiving subsystem by way of an electrical connection that also functions to receive MF-band signals. More particularly, the receiving element of the L-band antenna is electrically coupled to the front end receiving subsystem through a first conductor and the ground of the L-band antenna is electrically coupled through a second conductor to a ground of the receiving subsystem through isolation circuitry that presents a very low impedance to ground at L-band frequencies. The isolation circuitry also acts as a band pass filter centered in the MF-band, passing the MF-band signal received by the second conductor and rejecting L-band signals.

The receiving subsystem further provides an electronic processing path for the L-band signal received by the L-band antenna and provides an electronic processing path for the MF-band signal received by way of the electrical connection. The receiving subsystem, by incorporating suitable isolation circuitry, substantially isolates the L-band signal from the MF-band processing path and substantially isolates the MF-band signal from the L-band processing path. In this way, the L-band antenna and the electrical connection form a dual-band receiving structure for receiving both L-band and MF-band signals.

Although the present invention and its advantages have been described in detail, it should be understood that the present invention is not limited to the particular embodiments described in the specification. Persons of skill in the art will recognize that various changes, substitutions and alterations can be made to the embodiments of the invention described herein without departing from the spirit and scope of the invention as defined by the appended claims.

I claim as follows:

1. A method for receiving L-band signals and MF-band signals, comprising the steps of:

providing an L-band antenna for receiving an L-band signal;

providing an electrical connection for coupling the L-band signal from the L-band antenna to an L-band processing path and for receiving MF-band signals;

coupling MF-band signals received by the electrical connection to an MF-band processing path; and summing the L-Band and MF-Band signals.

2. The method of claim 1, further comprising the step of providing isolation circuitry that couples a first conductor of the electrical connection to a receiver ground at L-band frequencies and that couples the first conductor of the electrical connection to MF-band processing circuitry at MF-band frequencies.

3. The method of claim 2, further comprising the step of connecting a second conductor of the electrical connection to a transformer, the transformer coupling the L-band signal from a receiving element of the L-band antenna to the L-band processing path.

4. The method of claim 1, wherein the electrical connection comprises a coaxial cable with a second conductor interior to the first conductor, the first conductor formed by a shield of the coaxial cable exterior to the first conductor.

5. The method of claim 1, further comprising the step of providing substantial isolation of the MF-band signals from the L-band processing path and substantial isolation of the L-band signals from the MF-band processing path.

6. The method of claim 5, wherein substantial isolation is achieved by providing isolation circuitry that couples a first conductor of the electrical connection to a receiver ground at L-band frequencies and that couples the first conductor of the electrical connection to MF-band processing circuitry at MF-band frequencies.

7. The method of claim 6, wherein the isolation circuitry comprises:

a capacitance connected between the first conductor and a receiver ground, the capacitance presenting a very low impedance at L-band frequencies; and an inductance in parallel with the capacitance, the inductance selected to present a parallel resonant circuit at MF-band frequencies.

8. The method of claim 7, further comprising a resistance enabling selection of a bandwidth of the resonant circuit.

9. An apparatus for receiving L-band signals and MF-band signals, comprising:

an L-band antenna for receiving an L-band signal;

an electrical connection for coupling the L-band signal from the L-band antenna to an L-band processing path and for receiving and coupling MF-band signals to an MF-band processing path; and summing the L-Band and MF-Band signals.

10. The apparatus of claim 9, wherein:

the electrical connection comprises a first conductor that couples a receiving element of the L-band antenna to the L-band processing path; and a second conductor that receives the MF-band signal and couples a ground of the L-band antenna to isolation circuitry, wherein the isolation circuitry couples the second conductor through a low impedance to a receiver ground at L-band frequencies thereby isolating L-band signals from the MF-band processing path.

11. The apparatus of claim 10, wherein the electrical connection comprises a coaxial cable with the first conductor interior to a second conductor, the second conductor formed by a shield of the coaxial cable exterior to the first conductor.

12. The apparatus of claim 9, further comprising isolation circuitry for providing substantial isolation of the MF-band signals from the L-band processing path and substantial isolation of the L-band signals from the MF-band processing path.

13. The apparatus of claim 12, wherein the isolation circuitry couples a first conductor of the electrical connection to a receiver ground at L-band frequencies and couples the first conductor of the electrical connection to MF-band processing circuitry at MF-band frequencies.

14. The apparatus of claim 12, wherein the isolation circuitry comprises:

a capacitance connected between a first conductor of the electrical connection and a receiver ground, the capacitance presenting a very low impedance at L-band frequencies; and an inductance in parallel with the capacitance, the inductance selected to present a parallel resonant circuit at MF-band frequencies.

15. The apparatus of claim 14, further comprising a resistance enabling selection of a bandwidth of the resonant circuit.

16. The apparatus of claim 9, further comprising:

isolation circuitry for coupling a first conductor of the electrical connection to a receiver ground at L-band frequencies and coupling the, first conductor of the electrical connection to the MF-band processing path at MF-band frequencies; and wherein a second conductor of the electrical connection is coupled to a transformer, the transformer coupling the L-band signal from a receiving element of the L-band antenna to the L-band processing path.

17. A method for receiving L-band signals and MF-band signals, comprising the steps of:

providing an L-band antenna for receiving an L-band signal;

providing an electrical connection between a first conductor and an active element of the L-band antenna and providing an electrical connection between the first conductor and an L-band processing path;

providing an electrical connection between a second conductor for receiving MF-band signals and a ground of the L-band antenna and providing an electrical connection between the second conductor and an MF-band processing path;

providing substantial isolation of the MF-band signals from the L-band processing path and substantial isolation of the L-band signals from the MF-band processing path; and summing the L-Band and MF-Band signals.

18. The method of claim 17, wherein the L-band processing path comprises:

a band pass filter for passing L-band signals; and amplifier circuitry for amplifying L-band signals.

19. The method of claim 17, wherein the MF-band processing path comprises:

amplifier circuitry for amplifying MF-band signals; and wherein isolation circuitry is coupled to the input of the amplifier circuitry.

20. The method of claim 17, wherein signals from the L-band processing path and from the MF-band processing path are combined for transmission to one or more receivers.

* * * * *